Nov. 6, 1956

T. J. SORIANO ET AL 2,769,529

CONVEYOR APPARATUS WITH CLAMPING
AND STRETCHING MECHANISM

Filed Oct. 12, 1954

Inventor
THOMAS J. SORIANO,
BY JAMES D. ALESSIO.

Angelo M. Piserra
Attorney

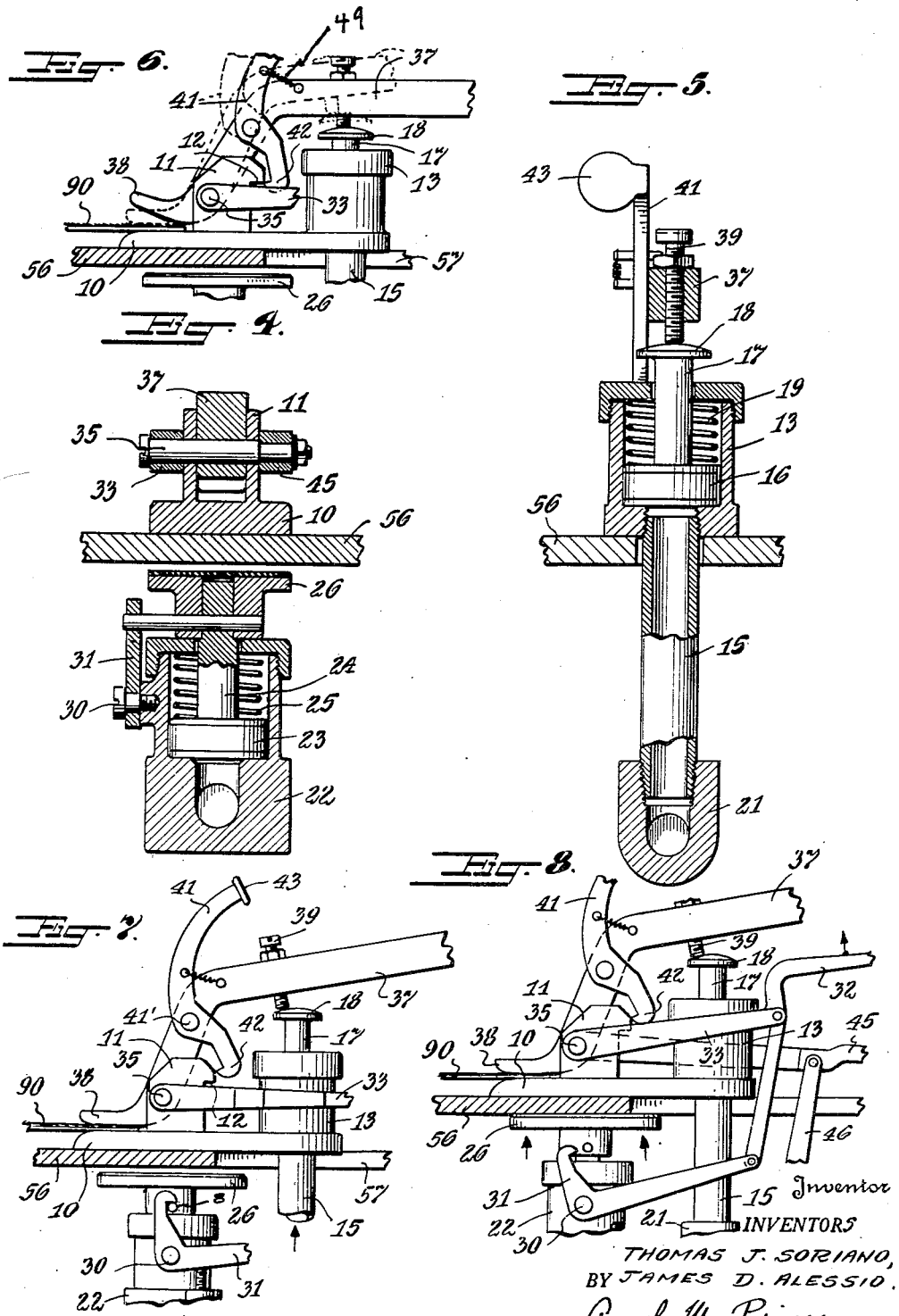

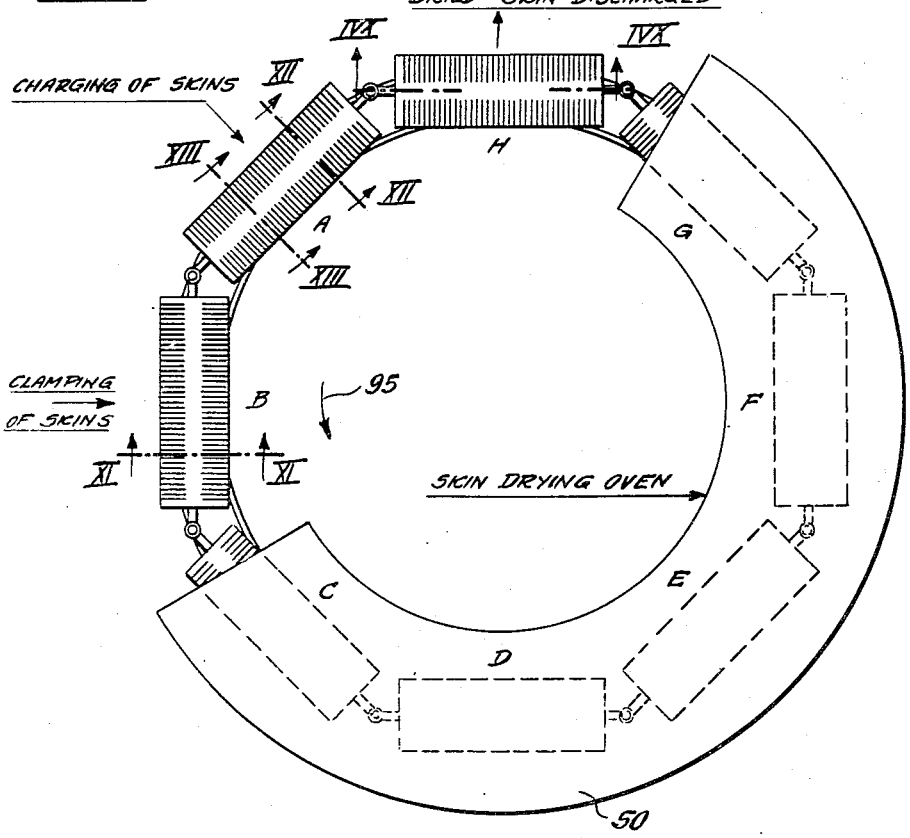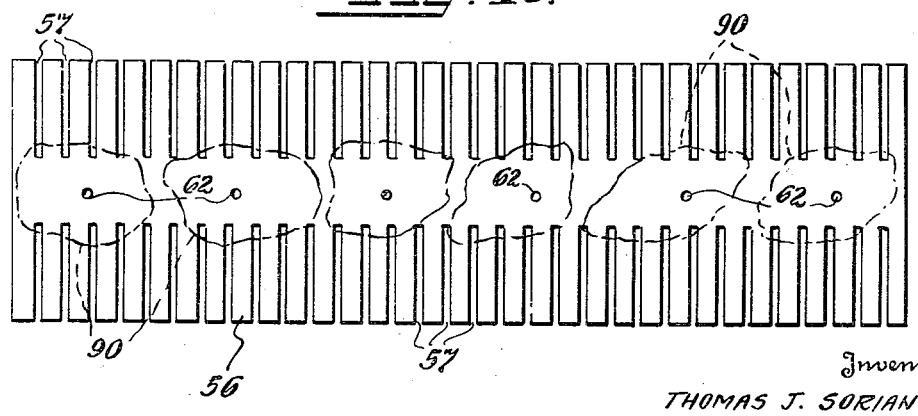

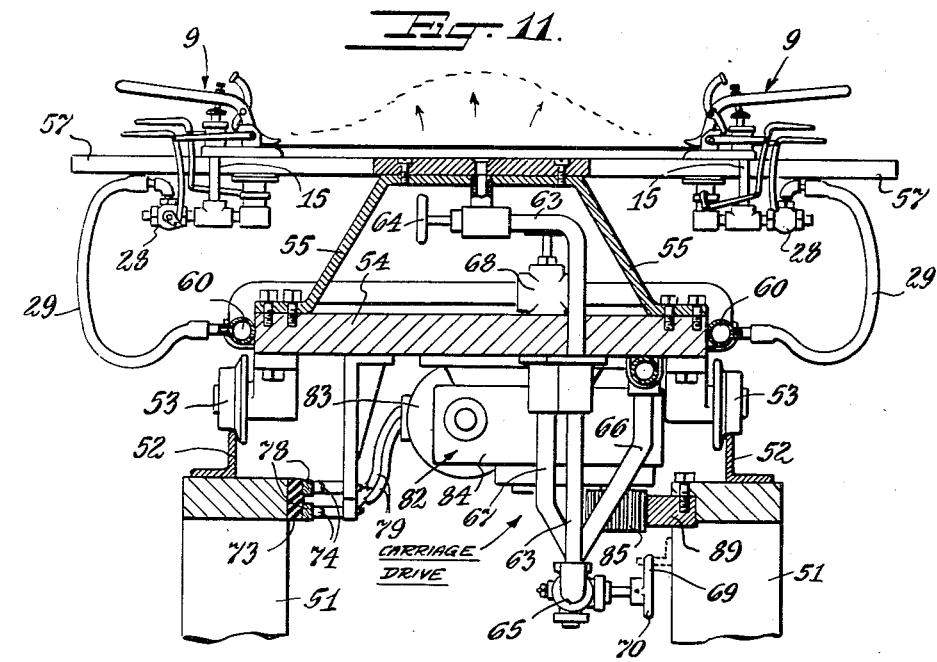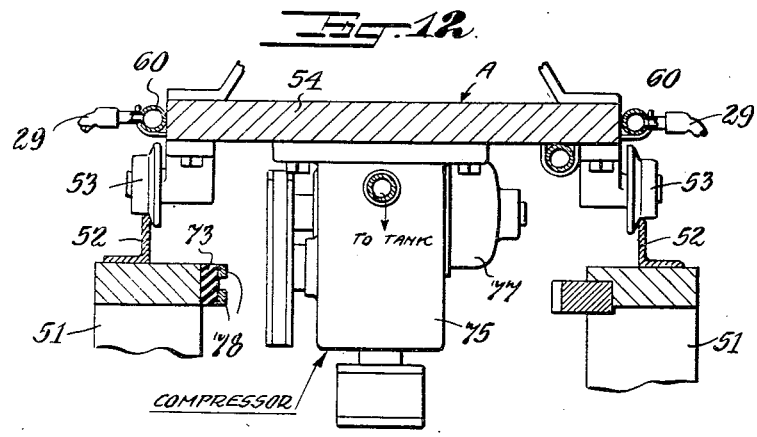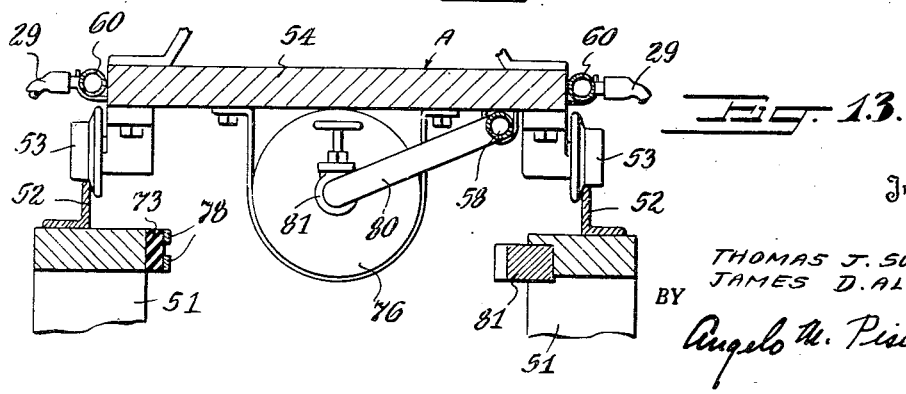

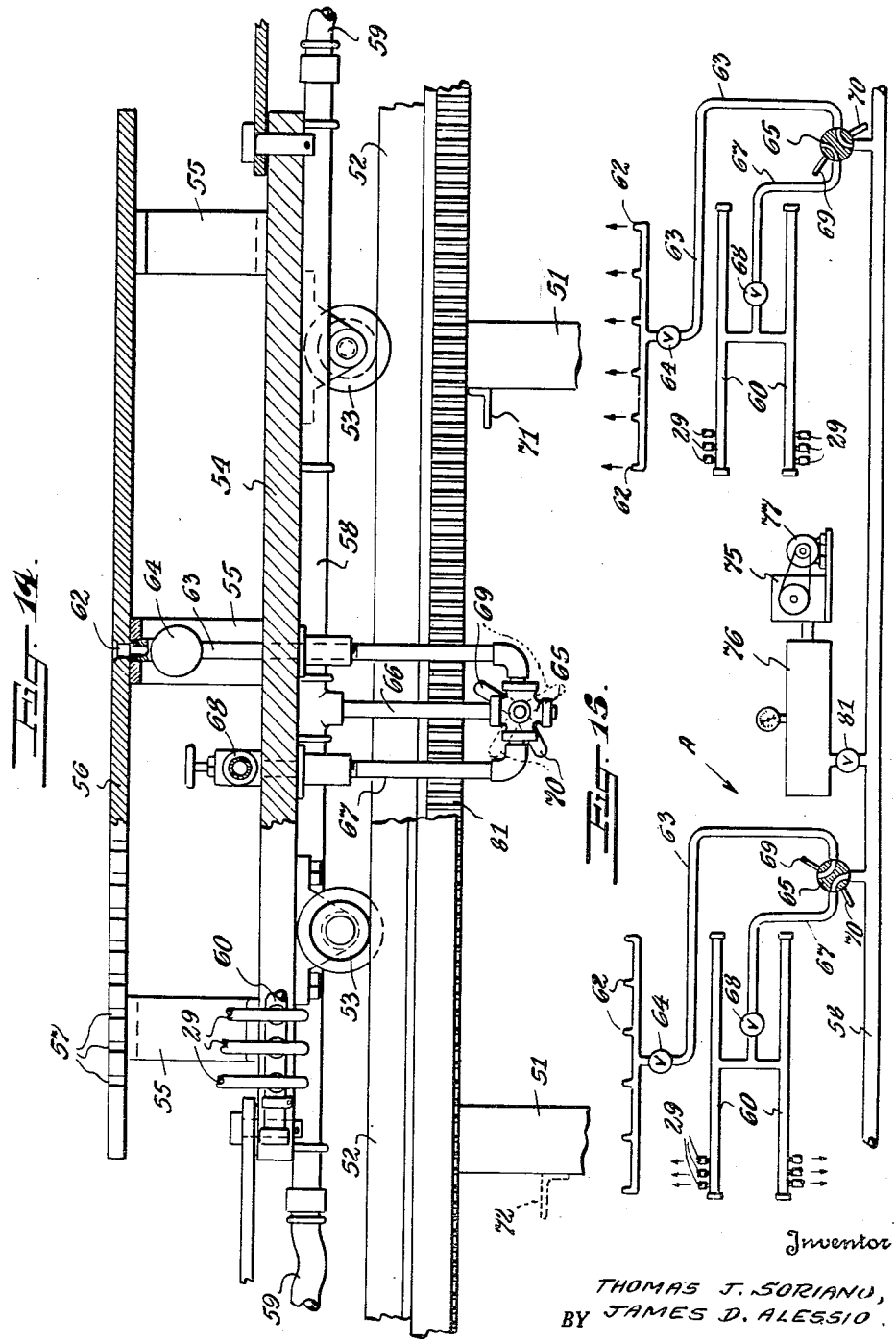

United States Patent Office 2,769,529
Patented Nov. 6, 1956

2,769,529

CONVEYOR APPARATUS WITH CLAMPING AND STRETCHING MECHANISM

Thomas J. Soriano and James D. Alessio, Newark, N. J.

Application October 12, 1954, Serial No. 461,892

16 Claims. (198—179)

This invention relates to novel methods and apparatus finding utility in various different fields. In one of its more specific aspects the invention is directed to novel methods and apparatus for clamping or holding materials and objects while being processed. The novel apparatus and methods of this invention find especial application in maintaining taut various materials such as skins, hides, furs, fabrics, flexible sheets or films in the course of their being processed, such as dried for example, or while they are otherwise being treated or processed, and for example in assembly with other components may be drilled, subjected to riveting or soldering operations.

One of the primary objects of this invention is to provide a novel and unique clamping apparatus.

Another object of this invention is to provide such an apparatus which is substantially self-stripping so that the material clamped thereby may be unclamped therefrom substantially automatically.

Another object of this invention is to provide a system or apparatus especially suitable for use in the stretching and/or drying of furs, hides, skins and also bulky materials.

Another object of this invention is to provide a novel system or apparatus which is also suitable for assembly operations.

Another object of this invention is to provide novel clamps for the stretching and/or drying of hides and skins without marring the surface thereof.

Another object of this invention is to provide novel clamps whose jaws may be interchanged and eliminating the necessity of costly dies and fixtures.

These and other objects and advantages of this invention will in part at least be obvious from the following description taken in conjunction with the drawings, wherein:

Fig. 4 is a cross sectional view taken on line IV—IV of Fig. 1.

Fig. 5 is a cross sectional view taken on line V—V of Fig. 1.

Fig. 6 is a fragmentary view in side elevation of the device shown in Fig. 1 but with certain parts omitted and shows the relationship of some of the parts from inoperative to operative relationship for clamping of the material.

Fig. 7 is a view similar to Fig. 6 and shows the relationship of some of the parts when the material is clamped between the stationary and movable jaws of the champing device.

Fig. 8 is a view similar to Fig. 7 and shows the relationship of some of the parts when the material is clamped between the movable jaw and the stationary jaw and also when the device is clamped to the table.

Fig. 9 is a diagrammatic view of a novel, automatic machine employing the clamping devices shown in Fig. 1 as elements thereof.

Fig. 10 is a top view of one of the clamping tables shown in Fig. 9.

Fig. 11 is a cross sectional view taken on lines XI—XI of Fig. 9.

Fig. 12 is a cross sectional view taken on lines XII—XII of Fig. 9.

Fig. 13 is a cross sectional view taken on lines XIII—XIII of Fig. 9.

Fig. 14 is a cross sectional view taken on lines XIV—XIV of Fig. 9.

Fig. 15 is a diagrammatic view of the air pressure mechanism and part of the system, with the right and left hand portions thereof showing a control valve in different positions.

Figure 1:
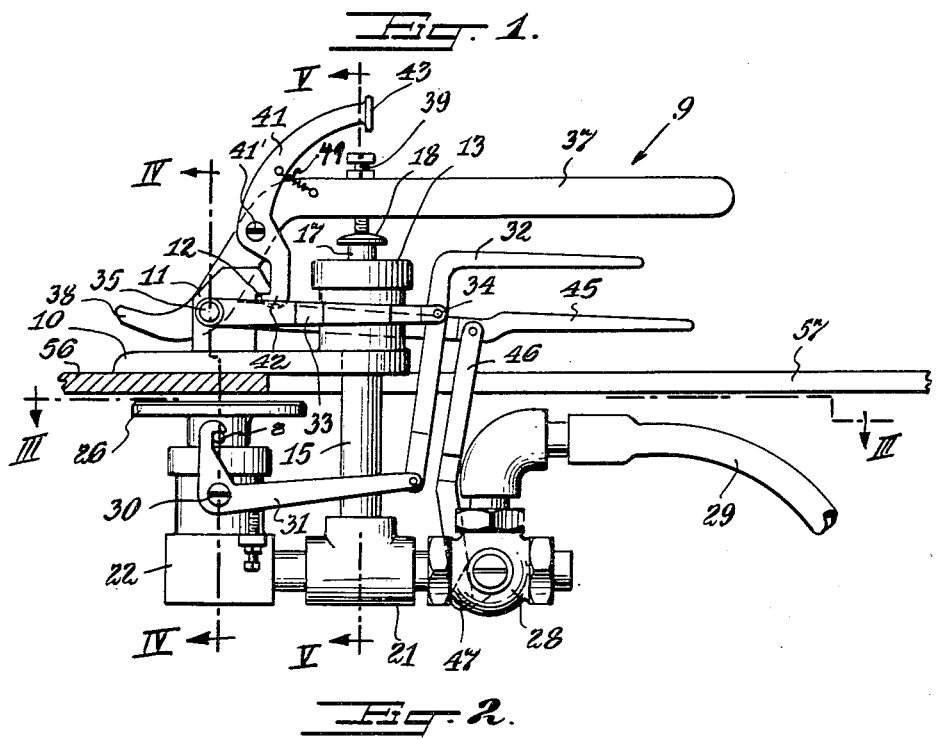
Fig. 1 is a view in side elevation of an embodiment of the novel clamping device illustrating the invention, and shows the supporting table. In this view, the clamping device is disposed in position on the table and is ready for use.
Figure 2:
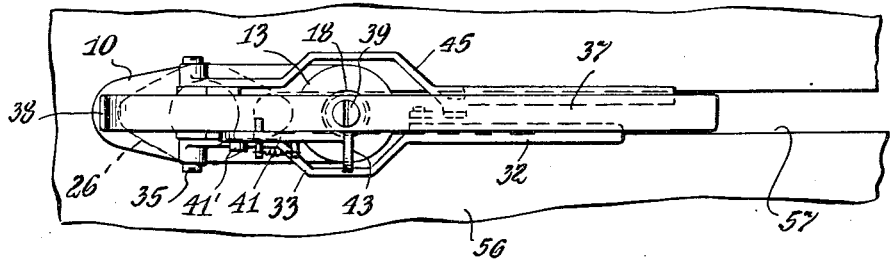
Fig. 2 is a top plan view of the device shown in Fig. 1.
Figure 3:
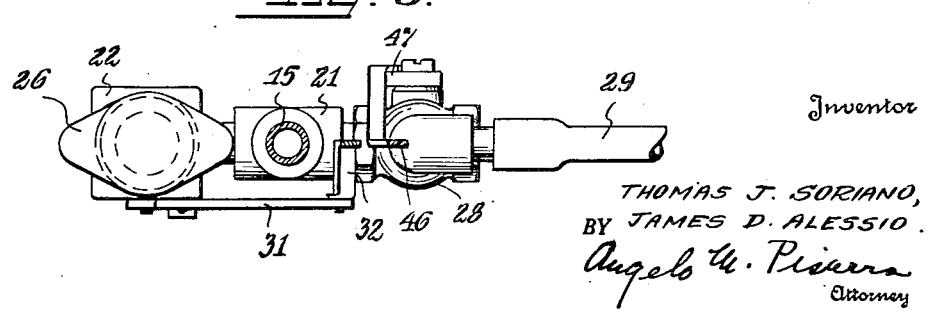
Fig. 3 is a cross sectional view taken on line III—III of Fig. 1 in the direction of the arrows.

As shown in Fig. 1, one embodiment of the novel clamping device 9 comprises a narrow and elongated, normally stationary jaw member 10 having a pair of ears 11 integral therewith, extending upwardly therefrom and located a considerable distance rearwardly of the front edge of the member 10. One of said ears 11 has a cut out to provide a latching shoulder 12. Fixedly mounted on the rear of the element 10 is a cylinder 13 having an opening in the bottom thereof communicating with a rigid pipe or conduit 15 extending through element 10. Located in said cylinder 13 is a movable piston 16 connected to a piston rod 17 extending through the upper face of cylinder 13 and terminating in a head 18. Also located in the cylinder 13 (Fig. 5) is a compression coil spring 19 which tends to maintain the piston 16 and piston rod 17 in retracted position. The lower end of the conduit 15 is secured to a T joint 21 at the midopening thereof. One of the end openings of the T joint 21 is connected to and communicates with a cylinder 22 having a piston 23 (Fig. 4) therein and a piston rod 24 extending upwardly from the piston 23 and extending out of the cylinder 22. Also located in said cylinder 22 is a compression coil spring 25 which tends to maintain the piston 23 and piston rod 24 in retracted position. A jaw element or clamping plate 26 is integral with the piston rod 24 at the upper end thereof and is disposed substantially parallel to the jaw element 10. The other end of said T joint 21 is connected to and communicates with a valve 28 having an inlet communicating with a flexible conduit 29 for admission of fluid or air pressure thereto.

The cylinder 22 has a pivot 30 secured thereto. Carried by said pivot 30 and pivotally supported thereon is a substantially L-shaped lever 31 whose shorter arm or leg terminates in a latching hook and whose longer arm or leg is pivotally connected to one arm or leg of an inverted L-shaped lever 32 whose other arm or leg extends rearwardly away from cylinder 13. Secured to piston rod 24 is a latching pin 8. A link 33 has one end pivotally supported on a pivot 34 secured to the arm or leg of 32. A pivot 35 extends through and is secured to the ears 11 and passes through an opening in the other end of the link 33. Said pivot 35 extends through an opening of an actuable member 37 located between ears 11 for pivotally supporting said member 37. The member 37 is essentially a somewhat L-shaped member having an elongated arm or leg and a shorter arm or leg terminating in a foot 38, with the long arm being a handle of such weight as to normally maintain the foot 38 in inoperative position. This handle carries an adjustable bolt 39 whose lower end is in contact with the upper end of the piston rod 17. A pivot 41' is carried by the shorter arm of element 37. A latching lever 41 is pivotally supported by said pivot 40. One end of lever 41 terminates in a hook or shoulder 42 for cooperating with shoulder 12 for latching purposes, while the other end terminates in a finger piece 43 for releasing latch 42 against the action of spring 49 having one end secured to lever 41 and its other end to element 37 and tends to maintain lever 41 in latching position. Said pivot 35 extends through an opening at the end of a lever 45 to pivotally support said lever which extends rearwardly therebeyond. A link 46 has one end thereof pivotally connected to said lever 45 intermediate its length and the other end of said link 46 is pivotally connected to an arm 47 for actuating the valve 28. The device 9 hereinbefore described in a single unitary assembly of light weight may be moved back and forth on a table 1 at will by the operator.

As shown in Fig. 9, I have provided a unique and novel apparatus which is mainly automatic and employed in the practice of this invention. This assembly as therein shown comprises a plurality of carriages A, B, C, D, E, F, G and H linked together and adapted to be driven in single file in a pre-determined path, generally circular in nature, and through a drying oven 50. The oven 50 is mounted in any convenient manner and is stationary at all times and may have as elements therein any suitable heating device or devices which may be electrical coils, steam pipes or the like, not shown, in order to control the temperature therein for the purposes hereinbefore indicated. Mounted on supports 51 are a pair of concentric and stationary circular tracks 52 for supporting and guiding the wheels 53 of each of said carriages A–H. As shown in Fig. 14 each of said carriages A–H comprises a foundation plate or support 54 mounted on two pairs of said spaced wheels 53. Located above the support 54 and supported thereby through uprights 55 is a work table 56 having a series of slots 57 on both sides thereof for accommodating the pipes 15 of the clamping devices 9, one of which is shown in Fig. 1. Supported on the lower side of the support 54 is a main air pressure feed line 58 whose ends are connected to flexible pipes 59 which connect the various pipes 58 of the respective carriages to each other. Pipes 60 are located on the respective sides of the support 54 and both are in turn connected to the main conduit 58. Each of said pipes 60 has a plurality of the flexible hoses 29 communicating therewith and with each of the hoses in turn communicating with the valve 28 of its respective device 9 shown in Fig. 1.

Each of said supporting tables 56 has a plurality of spaced openings 62 therein as shown in Figs. 10 and 14 through which may pass air for ejecting the material at the final stage of the process. Communicating with each of said openings 62 is a conduit 63 having valve 64 therein which is normally open. The conduit 63 in turn communicates with a three-way valve 65 which also communicates with the supply conduit 58 through a conduit 66. The valve 65 also communicates with the conduit 60 through conduit 67 through a normally open valve 68. The valve 65 has two spaced operating levers 69 and 70 which are operable in a particular sequence by striking against stationary fingers 71 and 72 carried by the supports 51. All of said carriages A–H are as aforedescribed.

Two carriages, for example carriages A and B, include additional elements. The carriage A includes an air compressor 75 secured to its support 54 and depends therefrom. The compressor 75 includes the customary elements thereof, namely a compression tank 76 together with a motor 77 and other subsidiary mechanism. The current for the motor 77 is supplied by a pair of circular contact rings 78 which may receive electric energy from a series of batteries or any other source of E. M. f. not shown, and which through a switch, not shown, may be electrically connected and disconnected to rings 78. Said contacts 78 are secured to a stationary annular insulator ring 73 secured to the outer ends of the inner supports 51 and supply current to the motor 77 by means of conductors 79 through appropriate brushes or sliding contacts 74 as shown in Fig. 11. The compression tank 76 communicates with all of the various in-line-connected conduits 58 through a conduit 80 having a normally open valve 81 therein. A circular gear track 89 is secured to the outer supports 51. The carriage B (Figs. 9 and 11) also includes below the platform 54 a driving mechanism 82 including an electric motor 83 whose drive shaft is coupled with a reduction gear box 84 whose output in turn is connected to a drive pinion 85 engaging the circular gear track 89. The current for the motor 83 is taken off of the conductor 79 by suitable electrical connections not shown.

The operation of the apparatus is as follows: A single operator is located in the vicinity of the discharge and charging stations and an operator is located on either side of the clamping station, which stations are shown in Fig. 9. Initially the operator at the charging station places a series of skins 90 to be stretched over each of the openings 62 and disposes them so that the edges thereof overlie at least in part some of the slots 57 as shown in Fig. 10. The train is continuously moving in its predetermined circular path and reaches the clamping station whereupon the operators on either side of the particular carriage at that station are in position to control the devices 9 for their intended purpose. At this station the valve 65 is in the position shown in the left-hand side of Fig. 15 wherein all of the devices 9 reaching that station have the maximum air pressure applied thereto from the compressor 75 through the main line 58, flexible hoses 29 and the valves 28. Each valve 28 at this stage is open so that the air pressure is applied to both of the cylinders 16 and 23. However, those cylinders are maintained in their lowermost positions by virtue of the locking levers 31 and 41 being in operative or locking position. Each device 9 is freely movable back and forth on the table 56 in any direction through the slot 57. The operator on either side of the carriage moves the device 9 towards the centerline of the carriage whereupon the marginal edge of the particular skin to be acted upon is disposed between stationary jaw 10 and foot jaw 38. Then the operator releases the latching lever 41 by applying finger pressure to the finger button 43 as shown in Fig. 1 to move the lever 41 to inoperative position as shown in Fig. 6. When this is accomplished the air pressure acting upon the piston 16 forces the piston and its rod 17 upwardly against the screw 39 to swing the lever 37 about the pivot 35 to move the clamping jaw 38 downwardly against the skin 90 to firmly maintain it in position between the stationary jaw 10 and the movable jaw 38 as shown in Fig. 7. With the skin in that position the entire device is pulled rearwardly. The operator on the other side has accomplished the same operation. Then the operator on one side raises the lever 32 to swing the lever 31 about pivot 30 to inoperative position whereupon the air under pressure acting upon the piston 22 forces the piston 23 against the action of the spring 25 to force the clamping jaw 26 up against the table 56 and cooperating with the stationary jaw 10 to firmly clamp the device to the table. After this is accomplished by one of the operators, the operator on the other side with the devices in the condition shown in Fig. 7 pulls to stretch the skin and he also while it is in taut condition actuates the lever 32 to unlatch the lever 31 and this particular device 9 in the same manner as before described becomes fixedly clamped to the table 56 through the air pressure transmitted to the movable jaw 26. A number of individual clamping devices 9 may be employed and used on an individual skin for the purposes described and the foregoing series of operations are employed for that purpose.

If, for any reason, it is desired to remove, reset or restretch a skin prior to its entrance into the drying oven, I have provided the mechanism shown whereby upon raising of the lever 45, the three-way valve 28 is actuated to block off the air pressure from the inlet hose 29 and to open the valve 28 which communicates with the cylinders 13 and 24 to the atmosphere for exhaust. When it is desired to again use the devices, they are reset to the condition shown in Fig. 1. Because of the weight of the handle of the lever 37 and because of the weight of the handle of the lever 32, when the valve 28 is in exhaust position these various locking devices, namely the latch 41 and the latch 31, automatically assume their latching or operative positions as shown in Fig. 1. However, in the normal course of usage a number of various skins are stretched and clamped to the particular carriages through the device 9 in the manner heretofore described.

These carriages travel in the direction of the arrows 95 into and through the skin drying oven 50 of any design. After each of the individual carriages emerges from the discharge end of the oven 50, the skins have been stretched and dried and are now ready for removal. At this stage, the discharge stage as shown in Fig. 9, the lever 69 of the three-way valve 65 strikes against the trip finger 71 to actuate the valve. This actuation of the valve 65 is changed from that shown on the left-hand side of Fig. 15 to that shown on the right-hand side of that figure so that all of the devices 9 on that particular carriage have their cylinders 13 and 22 communicating with the atmosphere while all the conduits 63 of that particular carriage contain air under pressure to aid in blowing off or ejecting the particular skins. At this stage the skins are in unclamped condition because due to the relieving of the air pressure in the cylinders the position of the respective parts assume the positions shown in Fig. 1 automatically. At this stage the operator removes the dry skins and stacks them in any convenient place. As the carriage train travels in this path, it moves forwardly whereupon the finger 70 of the three-way valve 65 strikes against the actuator 72 to return the three-way valve to its original position, namely that shown in the left-hand side of Fig. 15, the original condition heretofore described.

In the foregoing manner, the skins or other material to be treated may be easily and readily clamped to and unclamped from the respective carriages at the charging and discharging stations.

Since certain changes may be made in the above construction and different embodiments of the invention could be made without departing from the scope thereof, it is intended that all matter contained in the above description or shown in the accompanying drawings shall be interpreted as illustrative and not in a limiting sense.

I claim:

1. Apparatus of the class described comprising a carriage including a plurality of elements, means for driving said carriage in a pre-determined path, in combination with a clamping device carried by one of said elements and including a stationary clamping jaw and a pair of fluid actuable jaws, said fluid actuable jaws being independently operable respectively to cooperate with said stationary jaw to clamp said device to an element of said carriage and to clamp an element to be treated, and means for supplying fluid pressure to said fluid actuable jaws in the course of the travel of said carriage in said path.

2. Apparatus of the class described comprising a support, means for driving said support in a pre-determined path in combination with a pair of fluid actuable jaws and a jaw between said fluid actuable jaws and carried by said support, said fluid actuable jaws being movable towards said third mentioned jaw for clamping an element between one of said pair and said third mentioned jaw and for clamping said support between the other of said pair and said third mentioned jaw, and means for supplying fluid pressure to said pair to actuate them and in the course of travel of said support maintaining them in clamping condition.

3. Apparatus of the class described comprising a support, means for driving said support in a pre-determined path in combination with a plurality of clamping devices carried by said support, with at least one of said devices, located on one side of said support and at least one clamping device located on the other side of said support, each of said clamping devices including a pair of fluid actuable jaws and a third jaw between said fluid actuable jaws, said fluid actuable jaws being movable towards said third jaw to clamp an element to be treated between one of said pair and said third jaw and to clamp said support between said other of said pair and said third jaw, and means for supplying fluid pressure to actuate each jaw of said pair independently of the other and in the course of travel of said support maintaining said pair in clamping condition.

4. Apparatus of the class described comprising a plurality of supports connected together in single file, means for driving said single file of supports in a predetermined closed path, with each of said supports being in combination with a pair of fluid actuable jaws and a jaw between said fluid actuable jaws and carried by said support, said fluid actuable jaws being movable towards said third mentioned jaw and for clamping an element between one of said pair and said third mentioned jaw and for clamping said support between the other of said pair and said third mentioned jaw, and means for supplying fluid pressure to said pair to actuate them and in the course of travel of said support maintaining them in clamping condition.

5. Apparatus of the class described comprising a plurality of supports connected together in single file, means for driving said single file of supports in a predetermined closed path, with each of said supports being in combination with a plurality of clamping devices carried by said support, with at least one of said devices located on one side of said support and at least one clamping device located on the other side of said support, each of said clamping devices including a pair of fluid actuable jaws and a third jaw between said fluid actuable jaws, said fluid actuable jaws being movable towards said third jaw to clamp an element between one of said pair and said third jaw and to clamp said support between said other of said pair and said third jaw, and means for supplying fluid pressure to actuate each jaw of said pair independently of the other and in the course of travel of said support maintaining said pair in clamping condition.

6. Apparatus of the class described comprising a support, means for driving said support in a pre-determined path, in combination with a pair of fluid actuable jaws and a third jaw between said fluid actuable jaws and carried by said support, said fluid actuable jaws being movable towards said third jaw for clamping an element between one of said pair and said third jaw and for clamping said support between the other of said pair and said third jaw, and a fluid pressure system for supplying fluid under pressure to said pair to actuate them and in the course of travel of said support to maintain them in clamping condition, said system including a valve for releasing said fluid under pressure from said pair for unclamping.

7. Apparatus of the class described comprising a plurality of supports connected together in single file, each of said supports having a fluid pressure ejector opening therein, means for driving said supports in single file in a pre-determined closed path, each of said supports being in combination with a pair of fluid actuable jaws and a third jaw between said fluid actuable jaws and carried by said support, said fluid actuable jaws being movable towards said third jaw for clamping an element between one of said pair and said third jaw and for clamping said support between the other of said pair and said third jaw, and a fluid pressure system for alternately (1) supplying fluid under pressure to said pair to actuate them and in the course of travel of said support to maintain them in clamping condition and (2) for releasing said fluid under pressure from said pair for unclamping and to apply fluid under pressure through said ejection openings.

8. Apparatus of the class described comprising a plurality of supports connected together in single file, each of said supports having a fluid pressure ejector opening therein, means for driving said supports in single file in a predetermined closed path, in combination with a pair of fluid actuable jaws and a third jaw between said fluid actuable jaws and carried by said support, said fluid actuable jaws being movable towards said third jaw for clamping an element between one of said pair and said third jaw and for clamping said support between the other of said pair and said third jaw, a fluid pressure system including a valve carried by each support, and stationary means for actuating each valve in the course of travel of said supports for alternately (1) supplying fluid under pressure to said pair to actuate them and in the course of travel to maintain them in clamping condition, and (2) for releasing said fluid under pressure from said pair for unclamping and to apply fluid pressure through said ejector openings.

9. A clamping device comprising a jaw, a pair of cylinders connected to said jaw and being stationary with respect to said jaw, a piston in one of said cylinders, a clamping jaw connected to said piston and movable in response to movement of said piston to move said clamping jaw towards and away from said first mentioned jaw to clamping and unclamping positions, a support carried by said first mentioned jaw, a lever terminating in a clamping jaw and pivotally supported by said support, a piston in the other of said cylinders and operatively connected to said lever, said last mentioned piston being movable in its cylinder to actuate said lever to move its clamping jaw to clamping position.

10. A clamping device comprising a jaw, a pair of cylinders connected to said jaw and being stationary with respect to said jaw, a piston in one of said cylinders, a clamping jaw connected to said piston and movable in response to movement of said piston to move said clamping jaw towards and away from said first mentioned jaw to clamping and unclamping positions, a support carried by said first mentioned jaw, a lever terminating in a clamping jaw and pivotally supported by said support, a piston in the other of said cylinders and operatively connected to said lever, said last mentioned piston being movable in its cylinder to actuate said lever to move its clamping jaw to clamping position, means in each of said cylinders and acting upon the pistons therein and tending to maintain said pistons in retracting position for tending to maintain said last two mentioned jaws in unclamping condition.

11. A clamping device comprising a jaw, a pair of cylinders connected to said jaw and being stationary with respect to said jaw, a piston in one of said cylinders, a clamping jaw connected to said piston and movable in response to movement of said piston to move said clamping jaw towards and away from said first mentioned jaw to clamping and unclamping positions, a support carried by said first mentioned jaw, a lever terminating in a clamping jaw and pivotally supported by said support, a piston in the other of said cylinders and operatively connected to said lever, said last mentioned piston being movable in its cylinder to actuate said lever to move its clamping jaw to clamping position means for latching said first mentioned clamping jaw in unclamping position and means for latching said second mentioned clamping jaw in unclamping position.

12. A clamping device comprising a jaw, a pair of cylinders connected to said jaw and being stationary with respect to said jaw, a piston in one of said cylinders, a clamping jaw connected to said piston and movable in response to movement of said piston to move said clamping and unclamping positions, a support carried by said first mentioned jaw, a lever terminating in a clamping jaw and pivotally supported by said support, a piston in the other of said cylinders and operatively connected to said lever, said last mentioned piston being movable in its cylinder to actuate said lever to move its clamping jaw to clamping position, means for latching said first mentioned clamping jaw in unclamping position and means for latching said second mentioned clamping jaw in unclamping position, said last two mentioned means being independently operable whereby one of said clamping jaws may be in clamping position while the other is maintained in unclamping position.

13. A clamping device comprising a jaw, a pair of cylinders connected to said jaw and being stationary with respect to said jaw, a piston in one of said cylinders, a clamping jaw connected to said piston and movable in response to movement of said piston to move said clamping jaw towards and away from said first mentioned jaw to clamping and unclamping positions, a support carried by said first mentioned jaw, a lever terminating in a clamping jaw and pivotally supported to said support, a piston in the other of said cylinders and operatively connected to said lever, said last mentioned piston being movable in its cylinder to actuate said lever to move its clamping jaw to clamping position, a latching lever pivotally supported by said first mentioned cylinder, means connected to said first mentioned clamping jaw and adapted to cooperate with said latching lever to latch it against displacement, a lever pivotally supported by said first mentioned lever and cooperating with said first mentioned support to latch said first mentioned lever against displacement.

14. A clamping device comprising a jaw, a pair of cylinders connected to said jaw and being stationary with respect to said jaw, a piston in one of said cylinders, a clamping jaw connected to said piston and movable in response to movement of said piston to move said clamping jaw towards and away from said first mentioned jaw to clamping and unclamping positions, a support carried by said first mentioned jaw, a lever terminating in a clamping jaw and pivotally supported by said support, a piston in the other of said cylinders and operatively connected to said lever, said last mentioned piston being movable in its cylinder to actuate said lever to move its clamping jaw to clamping position, a latching lever pivotally supported by said first mentioned cylinder, means connected to said first mentioned clamping jaw and adapted to cooperate with said latching lever to latch it against displacement, a lever pivotally supported by said first mentioned support to latch said first mentioned lever and cooperating with said first mentioned support to latch said first mentioned lever against displacement, said levers being independently operable to latching and unlatching positions.

15. A clamping device comprising a jaw, a cylinder secured to said jaw rearwardly of the clamping face thereof, a support extending upwardly from said jaw, a pivot carried by said support, a lever terminating in a clamping jaw and carried by said pivot, a piston in said cylinder and cooperating with said lever to swing said lever about said pivot to move its clamping jaw to clamping position, a second cylinder, a piston in said second cylinder, a clamping jaw connected to said second piston, means communicating with said cylinders and adapted to conduct fluid under pressure to said cylinders, a latching lever pivotally connected to said second cylinder, means connected to said second mentioned clamping jaw and adapted to be engaged by said last mentioned latching lever to maintain said second mentioned clamping jaw in unclamping position, a latching lever pivotally supported by said first mentioned lever and adapted to engage said support to maintain said first mentioned clamping jaw in unclamping position.

16. A clamping device comprising a jaw, a cylinder secured to said jaw rearwardly of the clamping face thereof, a support extending upwardly from said jaw, a pivot carried by said support, a lever terminating in a clamping jaw and carried by said pivot, a piston in said cylinder and cooperating with said lever to swing said lever about said pivot to move its clamping jaw to clamping position, a second cylinder, a piston in said second cylinder, a clamping jaw connected to said second piston, means communicating with said cylinders and adapted to conduct fluid under pressure to said cylinders, a latching lever pivotally connected to said second cylinder, means connected to said second mentioned clamping jaw and adapted to be engaged by said last mentioned latching lever to maintain said second mentioned clamping jaw in unclamping position, a latching lever pivotally supported by said first mentioned lever and adapted to engage said support to maintain said first mentioned clamping jaw in unclamping position, means tending to maintain said second mentioned latching lever in operative position, said latching levers being independently operable to unlatching position.

References Cited in the file of this patent

UNITED STATES PATENTS 830,498    Doolittle _____ Sept. 11, 1906